(12) United States Patent
Soffer

(10) Patent No.: US 10,572,129 B2
(45) Date of Patent: Feb. 25, 2020

(54) DECLARATIVE USER INTERFACE REPRESENTATION CONVERSION VIA HIERARCHICAL TEMPLATES

(71) Applicant: Guy Soffer, Kfar Saba (IL)

(72) Inventor: Guy Soffer, Kfar Saba (IL)

(73) Assignee: SAP PORTALS ISREAL LTD, Ra'anana (IL)

( * ) Notice: Subject to any disclaimer, the term of this patent is extended or adjusted under 35 U.S.C. 154(b) by 810 days.

(21) Appl. No.: 14/582,798

(22) Filed: Dec. 24, 2014

(65) Prior Publication Data
US 2016/0188183 A1 Jun. 30, 2016

(51) Int. Cl.
| | |
|---|---|
| *G06F 3/0484* | (2013.01) |
| *G06F 17/24* | (2006.01) |
| *G06F 17/30* | (2006.01) |
| *G06F 3/0481* | (2013.01) |
| *G06F 16/84* | (2019.01) |
| *G06F 8/38* | (2018.01) |
| *G06F 9/451* | (2018.01) |

(52) U.S. Cl.
CPC ........ *G06F 3/04847* (2013.01); *G06F 3/0481* (2013.01); *G06F 8/38* (2013.01); *G06F 16/84* (2019.01); *G06F 17/248* (2013.01); *G06F 9/451* (2018.02)

(58) Field of Classification Search
CPC .... G06F 3/0482; G06F 11/3409; G06F 17/18; G06F 3/048; G06F 17/248; G06F 17/2247; G06F 17/2705; G06F 3/1245; G06F 17/2264; G06F 3/0481; G06F 3/0484
See application file for complete search history.

(56) References Cited

U.S. PATENT DOCUMENTS

| | | | |
|---|---|---|---|
| 7,853,553 B2 * | 12/2010 | Lankinen | G06F 17/30569 707/602 |
| 2004/0046789 A1 * | 3/2004 | Inanoria | G06F 8/38 715/748 |
| 2004/0148586 A1 * | 7/2004 | Gilboa | G06F 8/38 717/108 |
| 2006/0004845 A1 * | 1/2006 | Kristiansen | G06F 8/38 |

(Continued)

FOREIGN PATENT DOCUMENTS

| | | | |
|---|---|---|---|
| EP | 1770510 | 4/2007 | |
| EP | 2530583 | 12/2012 | |
| WO | WO 2004/019160 | 3/2004 | |
| WO | WO 2004019160 A2 * | 3/2004 | G06F 8/38 |

OTHER PUBLICATIONS

Extended European Search Report, from counterpart European Patent Application No. 15002932.0, dated Feb. 12, 2016, 7 pages.

(Continued)

*Primary Examiner* — Sang H Kim

(74) *Attorney, Agent, or Firm* — Klarquist Sparkman, LLP

(57) ABSTRACT

A declarative user interface representation in one declarative format can be converted to a declarative user interface representation in a different declarative format. Templates can rely on template helpers for mapping and programmatic extensions to support a wide variety of declarative formats. Complex scenarios such as composition and decomposition of properties across declarative representations can be supported. A hierarchical approach facilitates development and maintenance of solutions.

20 Claims, 12 Drawing Sheets

(56) References Cited

U.S. PATENT DOCUMENTS

| | | | |
|---|---|---|---|
| 2007/0094609 A1* | 4/2007 | Gilboa | G06F 8/10 715/762 |
| 2007/0220022 A1* | 9/2007 | Lankinen | G06F 17/30569 |
| 2010/0049729 A1* | 2/2010 | Black | G06F 16/88 707/803 |
| 2011/0258534 A1* | 10/2011 | Young | G06F 8/38 715/235 |
| 2014/0032480 A1* | 1/2014 | Lesage | G06F 17/243 707/607 |

OTHER PUBLICATIONS

"HTML Templating in SAPUI5," spyvee.com, Dec. 8, 2014, 3 pages.
"Handlebarsjs: Minimal Templating on Steroids," handlebarsjs.com, visited Dec. 22, 2014, 7 pages.
"XSLT Tutorial," w3schools.com, visited Dec. 23, 2014, 2 pages.
Kunz, "What is OpenUI5 / SAPUI5," Dec. 11, 2013, 15 pages.
Fowler, "RulesEngine: Should I use a Rules Engine?" martinfowler.com, Jan. 7, 2009, 2 pages.
"Drool—Pros and cons of Java rules engines," stackoverflow, Jan. 30, 2010, 3 pages.
"JRuleEngine, OpenSource Java Rule Engine," SourceForge, Apr. 16, 2008, 2 pages.
"XSLT," *Wikipedia*, visited Dec. 23, 2014, 6 pages.
"XPath Tutorial," w3schools.com, visited Dec. 23, 2014, 2 pages.
"XSLT Transformation," w3schools.com, visited Dec. 23, 2014, 3 pages.
"5 Selectors," Cascading StyleSheets Level 2 Revision 1, w3.org, visited Dec. 23, 2014, 16 pages.
"JSON," *Wikipedia*, visited Dec. 23, 2014, 9 pages.

* cited by examiner

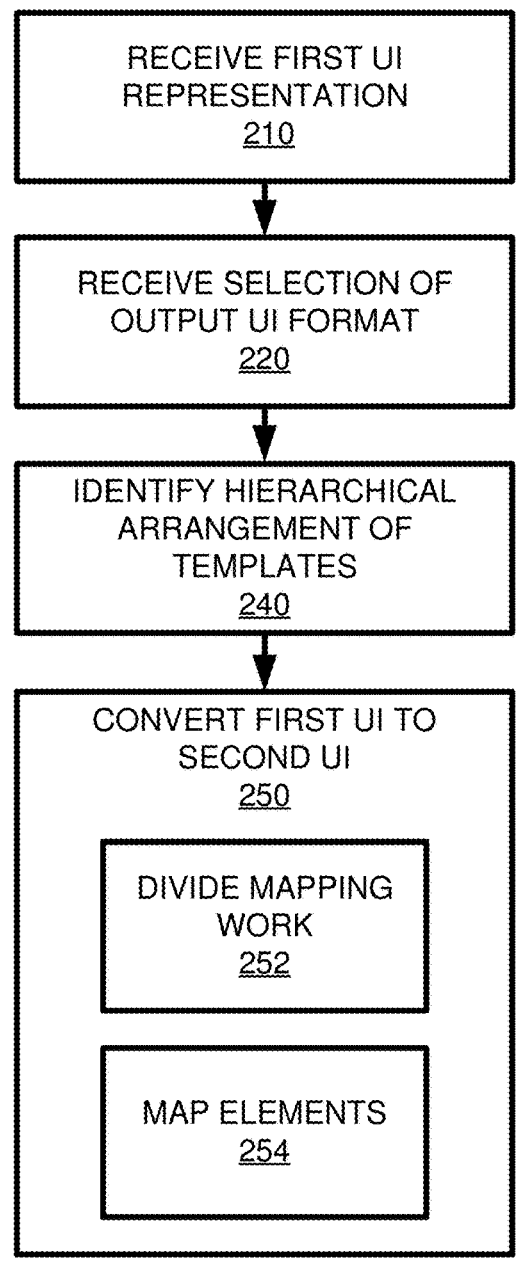
FIG. 2

```
1   {
2       "controls": [
3         {
4           "class": "SimpleWidgetType",
5           "type": "com.irise.irml.TextInput",
6           "name": "TextInput 1ff",
7           "id": "e74aa3d50ab341c89d4d3cb70c1866f9",
8           "property": [
9             {
10              "name": "defaultItem",
11              "data": [
12                "sdfsdf"
13              ]
14            },
15            {
16              "name": "width",
17              "data": [
18                "137"
19              ]
20            },
21            {
22              "name": "type",
23              "data": [
24                "text"
25              ]
26            },
27            {
28              "name": "height",
29              "data": [
30                "23"
31              ]
32            }
33          ]
34        }
35
36        ...
37        ]
38      }
39    ]
40  }
```

```
<mvc:View xmlns:core="sap.ui.core"
    xmlns:mvc="sap.ui.core.mvc"
    xmlns:l="sap.ui.commons.layout"
    xmlns:1="sap.ui.commons" controllerName="view.xmlView"
    xmlns:html="http://www.w3.org/1999/xhtml">
    <l:AbsoluteLayout width="800px" height="800px">
        <l:positions>
            {{~#each controls}}{{()> {{ff control}} {{(/each)}}
        </l:positions>
    </l:AbsoluteLayout>
</mvc:View>
```
1110

```
{{~#controlProperties 'TextArea,TextField'}}
    value="{{ui5PropertyMappingValue 'value'}}"
{{/controlProperties}}
{{~#controlProperties "Label,Button,CheckBox'}}
    text="{{ui5PropertyMappingValue 'text'}}"
{{/controlProperties}}
```
1150
1160

```
<l:PositionContainer left="{{ui5PropertyMappingValue 'left'}}px"
    top="{{ui5PropertyMappingValue 'top'}}px">
    <l:control>
        <{{controlType}} width="{{ui5PropertyMappingValue 'width'}}px"
            height="{{ui5PropertyMappingValue 'height'}}px"{{()> control_properties }}><?{{controlType}}>
    </l:control>
</l:PositionContainer>
```
1120
1130
1140
1145
1115
1100

FIG. 11

DECLARATIVE USER INTERFACE REPRESENTATION CONVERSION VIA HIERARCHICAL TEMPLATES

BACKGROUND

User interface design is central to creating quality software. Consequently, a large number of user interface creation tools have emerged to assist software developers. For a variety of reasons, it may become desirable to change tools and/or the underlying representation of the user interface. However, changing tools when user interfaces have already been developed is not so simple. Therefore, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a method of automated conversion of an input declarative representation of a user interface into an output declarative representation of the user interface of a different format, the method comprising: receiving the input declarative representation of the user interface, wherein the input declarative representation of the user interface is of a first hierarchical, declarative format; receiving a selection of a second hierarchical, declarative format; identifying a hierarchical arrangement of templates designated for user interface representation conversion to the second hierarchical, declarative format, wherein the templates process respective hierarchical levels in the output declarative representation of the user interface; and converting the input declarative representation of the user interface into the output declarative representation of the user interface, wherein the converting comprises executing the hierarchical arrangement of templates, wherein the executing comprises: dividing mapping work among the templates according to a hierarchical level in the output declarative representation to which a template is dedicated; and mapping user interface elements in the input declarative representation of the user interface to user interface elements in the output declarative representation of the user interface according to the templates.

An embodiment can be implemented as a system configured to convert a representation of a user interface from an input declarative user interface representation format into an output declarative user interface representation format, the system comprising: a plurality of templates arranged in a hierarchy, wherein at least two of the templates are partial templates dividing work according to a hierarchical level to which a template is dedicated; a plurality of property mappings referenced by the templates; a plurality of parsing instructions configured to parse declarative user interface representations of the input declarative user interface representation format; and a conversion engine configured to execute the parsing instructions, execute the plurality of templates in hierarchical order, and output a declarative representation of the user interface in the output declarative user interface representation format.

An embodiment can be implemented as one or more computer-readable media comprising computer-executable instructions that when executed cause a computing system to perform a method comprising: receiving a declarative input representation of a user interface in a first hierarchical, declarative format; and executing a plurality of templates arranged in a hierarchy comprising a full view template dedicated to generating a full view of an output declarative representation of the user interface, a layout template dedicated to generating a layout of the output declarative representation of the user interface, a control template dedicated to generating controls of the output declarative representation of the user interface, and a property template dedicated to generating properties of the output declarative representation of the user interface.

As described herein, a variety of other features and advantages can be incorporated into the technologies as desired.

BRIEF DESCRIPTION OF THE DRAWINGS

FIG. 2 is a flowchart of an example method of converting a user interface representation from one hierarchical, declarative format to another.

FIGS. 9 and 10 show example code snippets of input user interface code and template helpers used to create output user interface code.

FIG. 11 shows example hierarchical execution of templates.

DETAILED DESCRIPTION

Example 1

Example Overview

Figure 1:
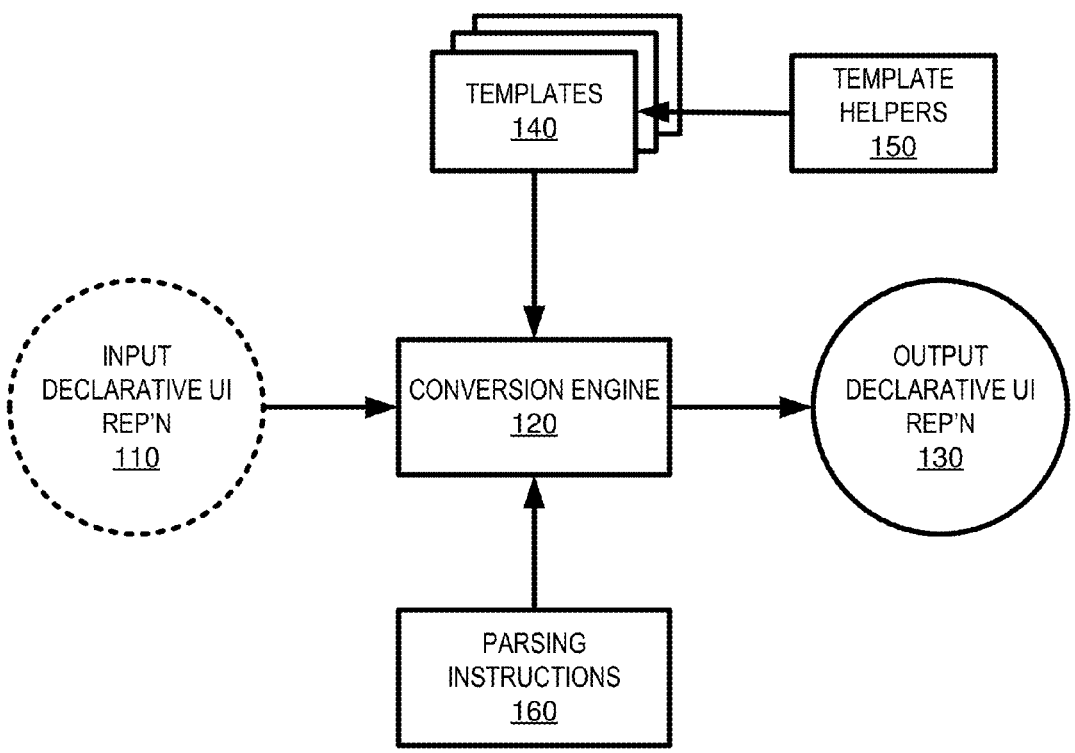
FIG. 1 is a block diagram of an example system for converting a user interface representation from one hierarchical, declarative format to another.

User interface (UI) development is central to quality software. Due to the challenges involved, a number of different technologies have emerged to develop user interfaces. The various user interface technologies have individual strengths and weaknesses. It can be advantageous to use one user interface technology in one stage of development and then switch to another user interface technology at a later stage of development. Similarly, at runtime, it can be helpful to switch technologies. For example, multiple technologies can be supported at runtime (e.g., based on the running platform, device, etc.). In other cases, switching between user interface technologies to take advantage of features, supported runtime environments, meet customer requirements, or harmonize with other systems may be desired.

One class of user interface technology utilizes declarative code to represent the user interface. Declarative user interface representations can be arranged in a hierarchy, as described herein. Because a wide variety of tools describe a user interface using a declarative format, the features described herein can be used across a wide variety of technologies.

The large number of declarative user interface representation formats employed by user interface technologies complicates conversion of user interfaces from one user interface technology to another. A developer's particular expertise with one user interface technology may not lead to expertise in another. Converting an existing user interface to a new or different technology can be cumbersome and require redevelopment using new or unfamiliar tools.

The technologies described herein can be used to convert a user interface representation in one declarative format to another declarative format without detailed knowledge of the unfamiliar user interface technology. In particular, hierarchical, declarative user interface representations are contemplated. Conversion from one user interface technology to another can be simplified by using reusable templates and template helpers.

The hierarchical structure of certain declarative user interface representations simplifies template development. A declarative hierarchy progressing from a high level view down to individual control properties at the lowest level can be leveraged to create specific templates for a particular hierarchy level. Mapping instructions for declarative elements can be used to convert the syntax from one user interface format to another. Such instructions can make it easier to construct mapping and templates as described herein. A specific parser need not be developed. The templates herein thus allow construction of a dynamic and generic solution that can be used across formats.

Templates for creating the target (output) format user interface representation can be designed for levels of the hierarchy and executed in a nested fashion to drill down to lower levels. Template helpers containing mapping and parsing instructions can be called from the templates to convert between elements of an input user interface technology and the target user interface technology. In this way, templates for a target user interface technology need only be designed once and can be used for multiple user interface representation input formats.

The technologies described herein can be used to convert from any declarative user interface representation format to any other declarative user interface representation format. For example, mockup user interface designs can be converted to a user interface runtime technology. User experience designers, who create mockup user interfaces, may not understand the runtime environment that a later developer will use. Manual coding by a developer to translate the visual representation of the mockup user interface to a user interface runtime technology is error prone and requires time consuming iterations. By using the technologies described herein, automatic conversion from a mockup hierarchical, declarative user interface representation to a runtime hierarchical, declarative user interface representation can be achieved.

The technologies described herein can be equally applied to converting between different user interface runtime technologies. In addition, the described technologies can be used at runtime to allow a user interface developed for one platform to be used in other future platforms.

Example 2

Example System for Converting a Declarative User Interface Representation

FIG. 1 is a block diagram of an example system 100 configured to convert a user interface representation from an input declarative user interface representation format into an output declarative user interface representation format.

In the example, an input declarative user interface representation 110 is received by a conversion engine 120, which creates an output declarative user interface representation 130. As described herein, the input and output declarative user interface representations 110, 130 can have a similar hierarchical structure (e.g., properties are inside controls, etc.), even if the structure is not identical.

The conversion engine 120 is configured to execute templates 140 in a hierarchical order from a high level to a low level. The templates 140 provide a framework for generating output declarative user interface representation 130. The templates 140 are reusable and are not dependent upon the tool or format used to create the input declarative user interface representation 110.

The templates 140 can call template helpers 150 for mapping elements of the input declarative user interface representation 110 to elements of the output declarative user interface representation 130. Mapping can be one-to-one, translating keywords between formats. Mapping can also be more complex, for example converting words to codes or true/false to binary. Custom mapping extensions can be added to the template helpers 150 for complex mapping.

The conversion engine 120 is configured to parse input declarative user interface representation 110 using parsing instructions 160 to provide input element types and/or values to the templates 140. The parsing instructions 160 can be used to extract elements of the input declarative user interface representation 110 for use by template helpers 150.

The conversion engine 120 generates output declarative user interface representation 130 in a declarative format described by templates 140. Templates can be full or partial, as described herein. Thus, a specific target user interface component can be encapsulated and isolated. Partials can be reused and shared within templates. Templates can be executed recursively.

In any of the examples herein, although some of the subsystems are shown as a single device, in practice, they can be implemented as computing systems having more than one device. Boundaries between the components can be varied. For example, although the parsing instructions 160 are shown as a separate item, they may be part of the template helpers 150.

In practice, the systems shown herein, such as system 100, can vary in complexity, with additional functionality, more complex components, and the like. For example, additional components can be included to implement runtime conversion, conversion to and from multiple declarative user interface codes, and the like.

In practice, a large number of different declarative formats representing user interfaces can be supported. Mockup user interfaces can be converted to runtime user interfaces, and vice versa. Conversion between different mockup user interface technologies can be realized to enable support in different content creation tools. Conversion between different runtime user interface technologies can be realized to enable use in different runtime technology platforms. Conversion between mockup user interface technologies and runtime user interface technologies can also be realized.

The system 100 and any of the other systems described herein can be implemented in conjunction with any of the hardware components described herein, such as the computing systems described below (e.g., processing units, memory, and the like). In any of the examples herein, the inputs, outputs, requests, user interface representations, templates, mappings, parsing instructions, helpers, and environments can be stored in one or more computer-readable storage media or computer-readable storage devices. The technologies described herein can be generic to the specifics of operating systems or hardware and can be applied in any variety of environments to take advantage of the described features.

Example 3

Example Method for Converting Declarative User Interface Representation

FIG. 2 is a flowchart of an example method 200 of automated conversion of an input declarative representation of a user interface into an output declarative representation of the user interface of a different format, and can be implemented, for example, in the system shown in FIG. 1.

At 210, an input declarative representation of a user interface is received. The representation is of a first hierarchical, declarative format.

At 220, selection of a second (output) hierarchical, declarative format is received. The format is a hierarchical, declarative format different than the first.

Template helpers in the form of mapping and parsing instructions can also be received. Such template helpers can assist in converting or mapping elements from one format to another.

At 240, a hierarchical arrangement of templates designated for user interface representation conversion to the second format are identified. As described herein, the templates can process (e.g., generate) respective hierarchical levels in the second declarative representation of the user interface. The hierarchical arrangement can implement semantic levels as described herein.

At 250, the conversion engine converts the input representation into the output representation. Converting can comprise executing the hierarchical arrangement of templates.

Such execution can comprise dividing mapping work among the templates according to a hierarchical level in the output declarative representation to which a template is dedicated. For example, a control template can partially process controls while invoking a properties template to finish the portion of the controls relating to properties.

Execution can comprise mapping user interface elements in the input declarative representation to the output declarative representation according to the templates.

Executing can comprise traversing successive levels of the hierarchical levels in the output declarative representation of the user interface. For example, following references in higher level templates to lower level templates in the hierarchical arrangement of templates.

Parsing can also be performed as described herein.

As described herein, a single set of templates can be used to convert many different input user interface representations to the selected user interface technology. The templates are reusable and need be created only once for a particular output format.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 210 "receive representation" can also be described as "send representation."

Example 4

Example User Interface

In any of the examples herein, a user interface can take the form of a visual rendering of elements by software. In practice, the term "user interface" is sometimes used to indicate the user interface as represented internally, even if it is not actually rendered.

The user interface can include layouts, controls, and properties that are displayed for consideration by a user. User interfaces can be implemented as mockups or functioning user interfaces. In a functioning user interface, a user can interact with a user interface to control an underlying system.

The user interface has a particular look and feel dependent upon the placement of controls, the size of controls, the overall size of the user interface, the type of controls used, the fonts used for text, and the text displayed. Other visual factors can also influence look and feel. In practice, a user interface is designed to provide quality software, and the look and feel of the user interface is an important aspect of user interaction.

The technologies described herein can convert between different user interface representation formats while maintaining the look and feel of the user interface, even if an exact conversion is not performed or possible.

Example 5

Example Declarative User Interface Representation

In any of the examples herein, a user interface can be represented in a declarative (e.g., non-imperative) way that describes a desired user interface without explicitly listing commands or steps that are performed to present such a user interface.

The representation is commonly generated by a tool or development environment, and is therefore sometimes called "code," even if the code is not a binary, executable package, or the like. Instead, the declarative representation can specify desired results (e.g., a user interface control of a particular color at a particular location) that are implemented by a rendering engine or similar technology.

The declarative representation can be domain-specific, such as a markup language. For example, user interface markup languages, such as XML, HTML, XAML, etc., are domain-specific, declarative representations that describe what is to appear on a webpage; the declarative portions need not specify the possible interactions with that webpage. JavaScript object notation ("JSON") is a language-independent data format that can be used.

Example 6

Example Similar Hierarchical Structure

A declarative representation can have any of a number of different syntaxes, but as described herein, a similar hierarchical structure can be leveraged to organize templates that process such an implementation.

A declarative representation of a user interface can have a hierarchical structure that follows a known hierarchy. In practice, the hierarchy can follow a structure such that the most general declaration contains more specific declarations within it. So, in the hierarchical structure, it is known that more general user interface elements contain more specific elements that further define the general element. For example, when a user interface control contains certain properties, the properties can be contained within the declaration of the control in the representation. The control is higher in the hierarchy and more general than the properties.

The exact hierarchical structure may vary slightly according to format, but commonalities between formats can be leveraged by dedicating templates to recognized levels in the hierarchy, implementing semantic user interface templates as described herein.

Example 7

Example User Interface Hierarchy

In any of the examples herein, a user interface hierarchy can be described by the levels at which elements of a hierarchical, declarative user interface representation occur. At each level, the generality of the user interface becomes more specific. For example, at the highest level, a user interface for a web application can contain a "page" element. The "page" element is the highest level in the hierarchy and describes the overall page size of the user interface. At a lower level, the page can contain "control" elements that describe particular controls that are displayed on the page. Each control, in turn, can contain properties on a still lower level. In practice, lower levels in the hierarchy can expand upon the higher levels and further describe those higher levels.

Example 8

Example User Interface Representation Format

In any of the examples herein, a user interface can be represented in any of a variety of declarative representations of a hierarchical, declarative format. The user interface format can include conventions for specifying layouts, controls, properties, and property values arranged in a defined order by levels. In such an arrangement, properties can be part of controls; controls can be part of layouts; and layouts can be part of overall views.

A declarative user interface representation can be implemented as code or markup language that describes how the user interface should appear and what properties it should have. In practice, the user interface view can contain one or more layouts (or containers) that in turn contain one or more controls and properties. Properties can have respective values. The hierarchical structure of the declarative user interface format provides a known order of controls.

A declarative user interface can be represented by a number of different formats, such as XML, JSON, XAML, HTML, or any other hierarchical, declarative format.

Example 9

Example User Interface Technologies

The features described herein can support any of a variety of technologies underlying declarative user interface formats. In practice, a particular technology may be better suited for a particular purpose or environment.

For example, a technology may include a tool that generates a user interface that is functional at runtime, in the sense that it can be rendered in a respective viewer technology, and a user can interact with it. In other words, a runtime user interface can be fully functional and presented in a respective application. For example, SAP UI5 is a hierarchical, declarative user interface representation format, similar to HTML5, that can be rendered in a web browser and allow user interaction with the user interface it represents.

Alternatively the declarative user interface can be a mockup, where it is a static representation with no or limited user interaction. For example, user interfaces developed in iRise, PowerPoint, Balsamiq, etc., are mockups and are simulations rather than fully functional runtime user interfaces.

Any other technology using a declarative representation of a user interface can take advantage of the features described herein.

Example 10

Example Templates

As described herein, the user interface templates (or simply "templates") can contain information for generating an output declarative representation of a user interface. Some templates can be partial templates in that they rely on other templates (e.g., lower in the hierarchy).

Template helpers can be used to implement mapping, mapping semantics, custom extensions, and the like. For example, a template can invoke a template helper comprising executable code performing a calculation mapping a user interface element of a first format to a user interface element of a second format. Calculations can map a series of numbers to a string; map a number to a binary; vice-versa; and the like.

Template helpers can take the form of a mapping table that has a simple mapping (e.g., from a property name in one format to an equivalent property name in another format).

Helpers can also comprise the parsing instructions described herein for parsing an input declarative representation.

Example 11

Example Template Hierarchy

Figure 3:
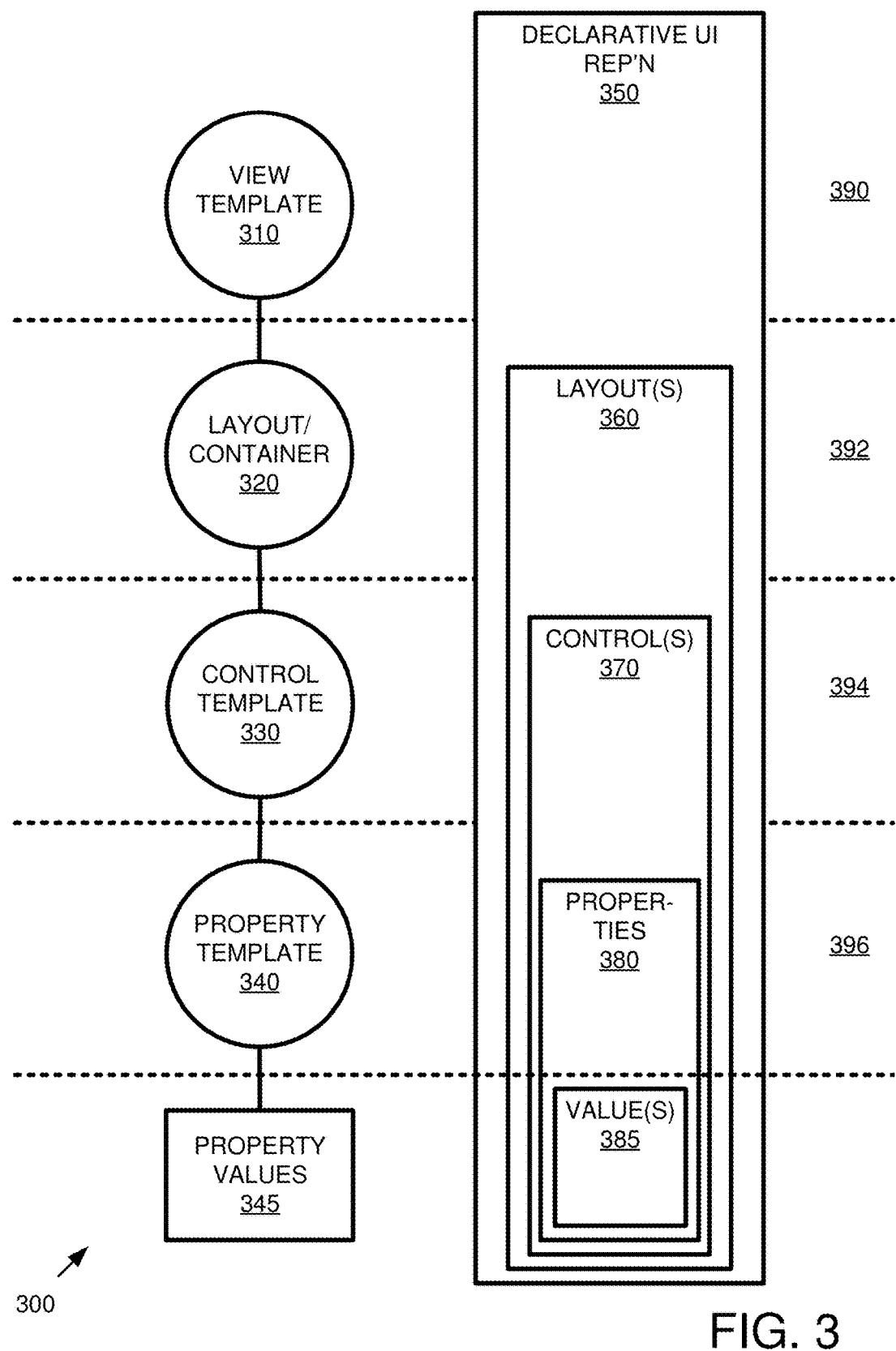
FIG. 3 is block diagram of an example template hierarchy.

FIG. 3 is block diagram of an example template hierarchy 300. In any of the examples herein, templates in such a hierarchical arrangement can be used to convert to (e.g., generate) a declarative representation of a user interface a selected declarative format.

In the example, the view template 310 is the most general template. One form of a view is a page. The view template 310 can be used to generate a complete user interface page that can be rendered in a suitable viewing application. As such, the view template 310 can be the highest level of a template hierarchy 300. The view template 310 can call lower level templates to generate code within the page to create a user interface representation. The view template 310 need not be dependent on the input user interface format.

In the example, the next level of the hierarchy comprises the layout/container template 320. At this level of the hierarchy, the view can be further modified with layout and/or container elements. For example, in HTML, the <div> element can position lower level elements at specified positions in the view. Likewise, a table element can be used to arrange controls or text in a view. The layout/container template 320 converts layout/container level elements from the input declarative user interface representation to the output declarative user interface representation.

The layout/container template 320 can support recursion (e.g., the template 320 refers to itself). Such an arrangement can account for containers inside of containers in a single, logical level of the hierarchy while preserving lower levels of the hierarchy. For example, recursion can continue until a control is reached in the representation.

Looping can be supported so that an upper level template (e.g., layout) repeatedly invokes a lower level template (e.g., control). A recursive implementation can have an upper level template invoke a lower level template, which invokes itself (e.g., until no more controls remain in the layout).

Layouts and/or containers typically contain controls, thus the next lower level in the hierarchy can be the control template 330. Layout/container template 320 can call control template as many times as there are controls present. Thus, the layout/container template 320 can invoke multiple instances of lower level templates to generate multiple controls.

The control template 330 occupies the next level in the template hierarchy 300. At this level of the hierarchy, controls can be generated within the framework of code generated by the layout/container template 320. A control generated by the control template 330 can have properties, thus, the control template 330 can call a property template 340.

The property template 340 comprises the lowest level of the template hierarchy 300. The property template 340 converts individual properties in the input user interface to properties in the output user interface. In practice, the property values 345 can also be processed by the property template 340.

A call to the control template 330 is followed by a call to the property template 340 for respective control elements found in the input user interface. Multiple calls to the control template 330 can convert controls from the input user interface representation to the output user interface representation.

A template in the template hierarchy 300 can create code for a selected output format. The format of the input user interface does not alter the templates (e.g., the same templates can be used for different input formats).

Example 12

Example Level-Dedicated Templates

In any of the examples herein, templates can be implemented as level-dedicated templates. In other words, for a declarative user interface representation 350 having a plurality of hierarchical levels 360-380, the templates 310-340 can process (e.g., generate) portions of the user interface representation 350 to which they are dedicated in a same level 390-396 of the hierarchical arrangement.

As described, templates are arranged in a hierarchy with a highest level 390, intermediate levels 392 and 394, and a lowest level 396.

Such an arrangement can lead to more efficient development and maintainability of the templates because a template need only implement semantics of the user interface semantic level at which it operates. For example, a control template need only be concerned with semantics of the control level; it can delegate conversion of properties within a control to a properties template, and so forth.

In any of the examples herein, the hierarchical arrangement of templates can comprise a plurality of different levels mirroring hierarchical levels common to declarative user interface representations. The templates can process user interface elements of the declarative user interface representation corresponding to their respective hierarchical levels.

Templates can be restricted to handling a given hierarchical level of the user interface representation (e.g., the level corresponding to a given level in the templates).

When performing parsing of the input declarative representation of the user interface, the parsing can divide the input declarative representation into portions at respective hierarchical levels in the input declarative representation of the user interface.

Templates can invoke themselves via recursion. For example, recursion can process a plurality of declarative user interface elements inside a single logical level within the output declarative representation.

Example 13

Example Mappings

In any of the examples herein, a wide variety of mappings can be supported. Simple mapping via a static table or table-like structure can be implemented. More complex and dynamic mapping can be performed programmatically. A single template can implement a mix of both static and dynamic mapping.

Examples of mappings for a button are shown in the table below:

| iRise.Button | UI5.Button |
|---|---|
| Text = "hi" | Text = "hi" |
| Location | Position |
| X = 5 | X = 5 |
| Y = 10 | Y = 10 |
| Color | Color = "10, 20, 30" |
| R = 10 | |
| G = 20 | |
| B = 30 | |

Examples of mappings for a Checkbox are shown in the table below. The example shows how two controls that have a relation (e.g., a checkbox and its label) are mapped to a single control (e.g., checkbox) because a UI5 checkbox has a label property as part of the checkbox and no additional label control is required:

| iRise.Label and iRise.Checkbox | UI5.Checkbox |
|---|---|
| Label | |
| Text = "Check me" | Text = "Check me" |
| checkbox | |
| Checked = "true" | Checked = "true" |

Example 14

Example Implementation in Conversion Engine

Figure 4:
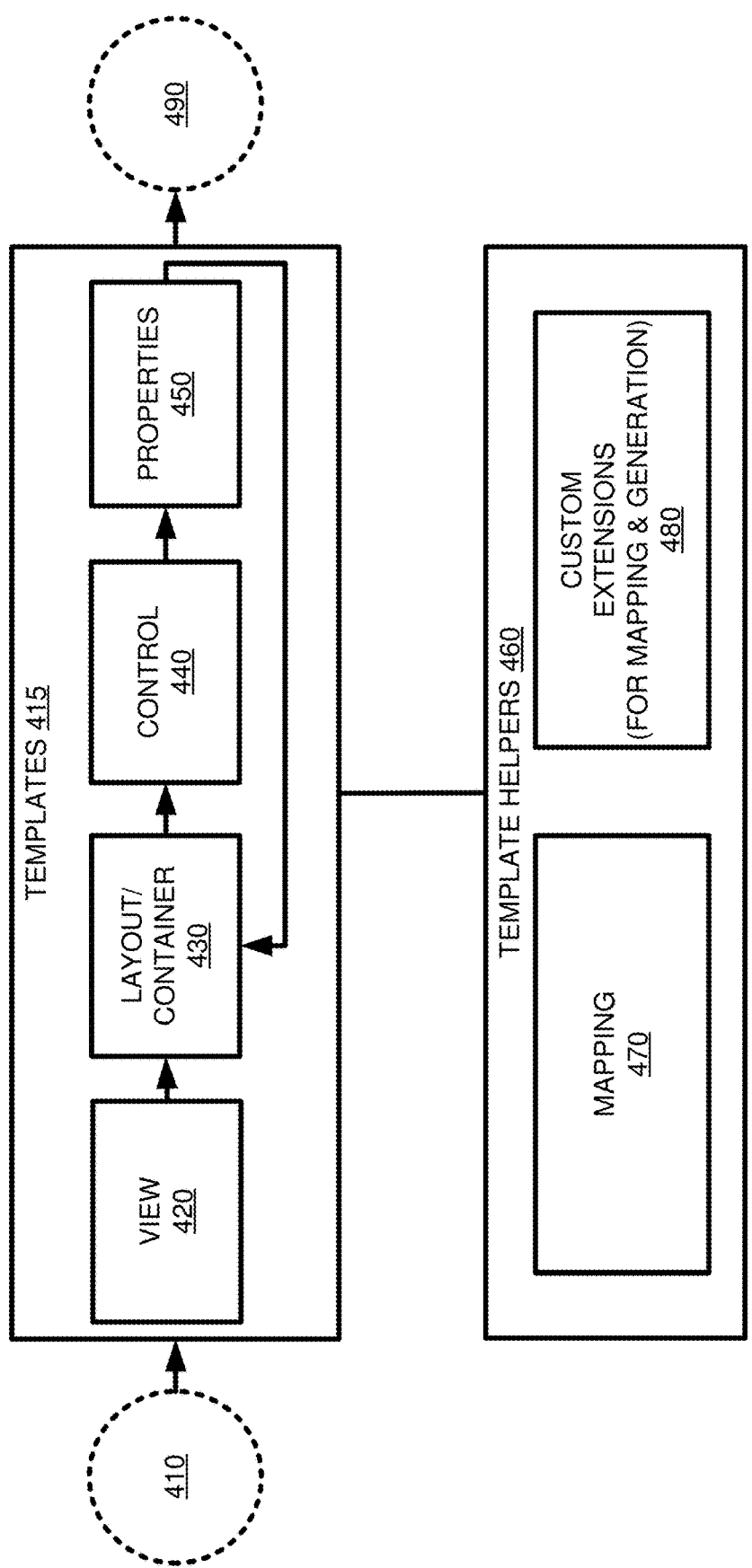
FIG. 4 is a block diagram of an example hierarchical execution of templates to convert a declarative user interface representation.

FIG. 4 is a block diagram of an example system 400 implementing hierarchical execution of templates to convert a declarative user interface representation using a conversion engine and can be implemented, for example, as part of FIG. 1. In the example, the templates 415 are arranged in a hierarchy for creating an output declarative user interface representation 490 (e.g., converting the input representation 410 into the output representation 490).

The hierarchy of the templates 415 represent, and are arranged in, the hierarchical structure of the output declarative format.

As shown, the templates 415 can comprise a view 420, a layout/container 430, a control 440, and properties 450. The view 420 can be executed once and can create the overall view of output user interface. The view 420 can be a full template, which creates a full target view in a respective user interface format. In other words, the view 420 is a complete template for creating a shell user interface that can be rendered completely. For example, in HTML the template could generate the <html></html> tags. Thus, the view 420 represents the highest level in a respective declarative format.

The view 420 can contain links to partial templates. In the example, layout/container 430, control 440, and properties 450 are partial templates. For example, a partial template can be used to generate a single control or property of a control, which may not by itself be renderable in a respective user interface format. Partial templates, thus, can be used to generate a wrapper, or definition, of a lower level element that an even lower level template fills in.

The layout/container 430 can be a template that contains many controls, themselves comprised of many properties. In that respect, layout/container 430 can repeatedly invoke lower level templates. In other words, the template can branch to lower level templates more than once in order to convert all lower level elements. For example, if two controls are present in a layout, control 440 and properties 450 can be called twice from layout/container 430.

Control 440 can be a template that is used to define a control in the output user interface format. Control 440 is also a partial template and further calls properties 450 to fill in the properties of the control.

Templates 415 are created once for a selected output user interface format. A set of templates 415 can be used to convert any user interface format, formatted in a hierarchical, declarative format, to the declarative format supported in the templates.

Template helpers 460 can be used by the templates 415 for mapping elements from the input user interface 410 to the output user interface 490. Template helpers 460 can include mapping instructions 470 that define the conversion between elements of one declarative format to another declarative format. For example, "top" can be mapped to "y." Template helpers 460 can also include custom extensions 480, which can provide more advance logic for mapping. For example, "top" could be a combination of "x" and "y" according to an arithmetic equation.

Mapping instructions 470 can be called from within a respective template. The mapping instructions 470 can include mapping for different template levels or can be divided into smaller sets of instructions such that each template level calls specific mapping instructions 470.

Template helpers 460 can also include parsing instructions (shown in FIG. 9). Parsing instructions can be used by the mapping instructions to get the context of elements in the input declarative user interface representation and return the element to be mapped.

Example 15

Example Method of Converting Using Hierarchical Templates

Figure 5:
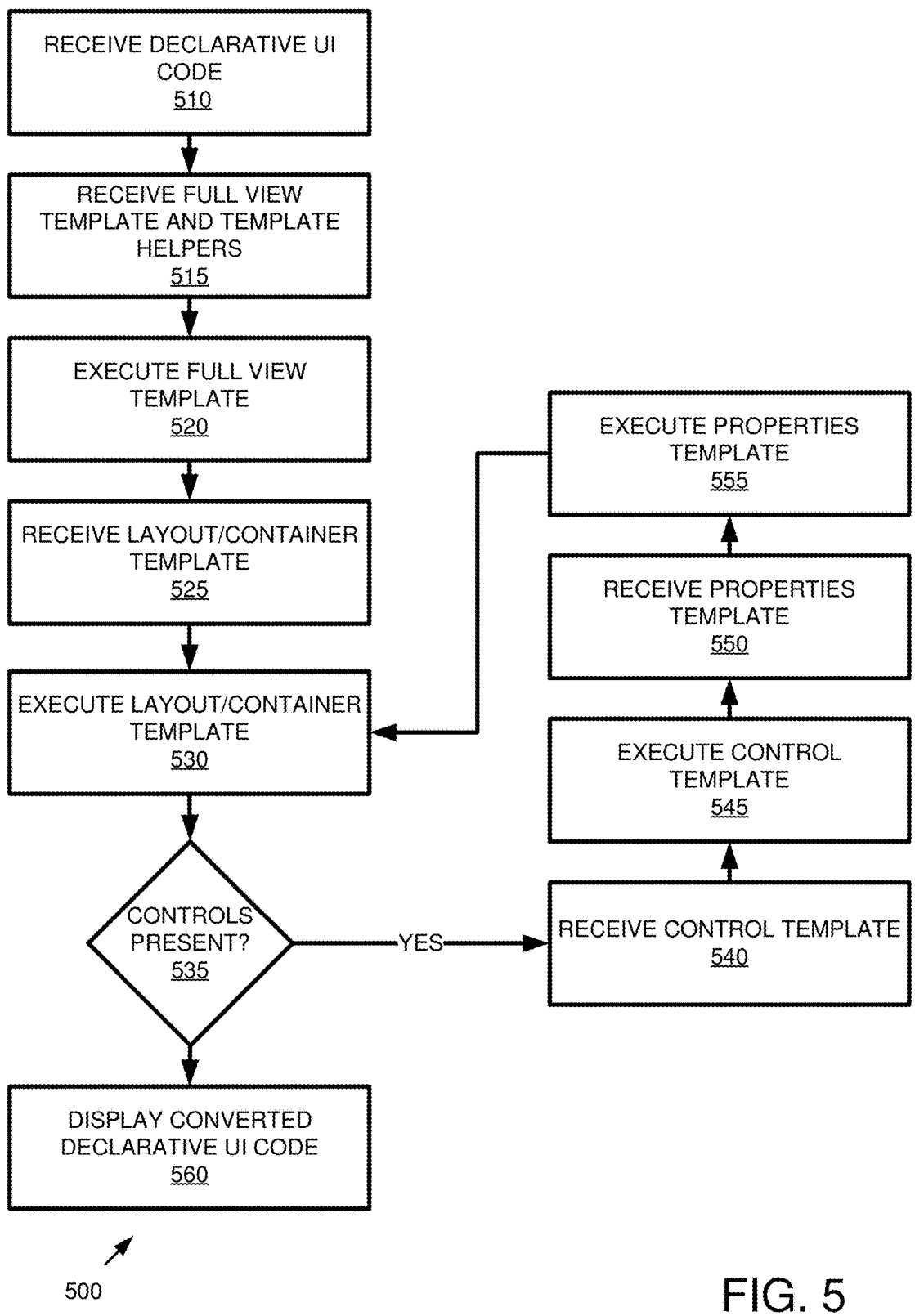
FIG. 5 is a flowchart of an example method of converting a user interface representation from one hierarchical, declarative format to another.

FIG. 5 is a flowchart of an example method 500 of for converting a user interface representation from one hierarchical, declarative format to another and can be implemented, for example, in the systems shown in FIG. 1 or 4.

At 510, an input declarative user interface representation is received. The representation represents a user interface in a respective (first) hierarchical, declarative format.

Upon selection of an output user interface representation format, a highest level template is received at 515. In the example, the highest level template is the full view template, which generates code for the overall view in a respective user interface technology. Template helpers are received along with the template. The template helpers in the example method can be used to parse and map user interface elements at different levels of declarative language hierarchy. Template helpers can alternatively be received along with each template.

At 520, the full view template is executed. The full view template generates an output representation representing the full view of the selected output user interface. Execution instructions in the full view template can call the next lower level in the hierarchy.

At 525, in response to a call to the next lower level of hierarchy, the conversion engine receives the layout/container template. The template helpers, in the example, are not received (again) because they describe the mapping and parsing instructions for different levels of the hierarchy. The layout/container template can be a partial template that generates code for specific elements of the output user interface representation.

At 530, the layout/container template is executed. Code generated from layout/container template is inserted within the framework generated by the full view template, as described herein. In this way, successive execution of hierarchical templates builds the output user interface code from the most general elements to the most specific elements.

In the example, the layout/container level can contain one or more controls with properties. At 535, the layout/container template executes a loop, calling a control template for each control, if present.

If a control is present, the control template is received at 540. Code generated from the control template is inserted into the framework generated by the layout/container template. The control template calls the properties template to generate properties within the control.

At 550, the properties template is received and at 555 the properties template is executed. The code generated from the properties template is inserted into the framework generated by the previous calling of the controls template.

Execution then returns to the layout/container template at 530. If another control is present in the input declarative user interface the same control and properties templates are executed but receive information relating to the next control element of the input declarative user interface from the template helpers.

At 560, when no more controls are present the recursive execution of the layout/container template completes. Upon completion of execution of the templates, an output declarative user interface is created in a different hierarchical, declarative format.

Execution of each template at the respective levels in turn calls the mapping and parsing instructions. As described herein, the mapping and parsing instructions parse the input declarative user interface and map the parsed elements from the input declarative format to the selected output declarative format.

Example 16

Example Mapping Between Single and Composite Controls

Conversion of control elements in an input user interface to control elements in an output user interface can be one-to-one. That is, each control in a respective input declarative user interface representation can have a direct counterpart in an output declarative user interface representation. For example, a text input control in the input user interface can have a corresponding text input control in the output user interface.

There are more complex scenarios, however, where in one user interface technology multiple controls can be mapped to a single control in another user interface technology, or vice versa. For example, in the iRise technology, a mockup user interface content creation tool, a checkbox and the checkbox label are two different controls. But in the SAP UI5 technology, a runtime user interface technology, a checkbox and its label are one control. Therefore, when mapping a checkbox label from iRise to SAP UI5, the control can be mapped to a property of the checkbox in SAP UI5. Thus, mapping moves the control in iRise from the control level in the user interface hierarchy to the property level in the SAP UI5 user interface hierarchy.

Figure 6:
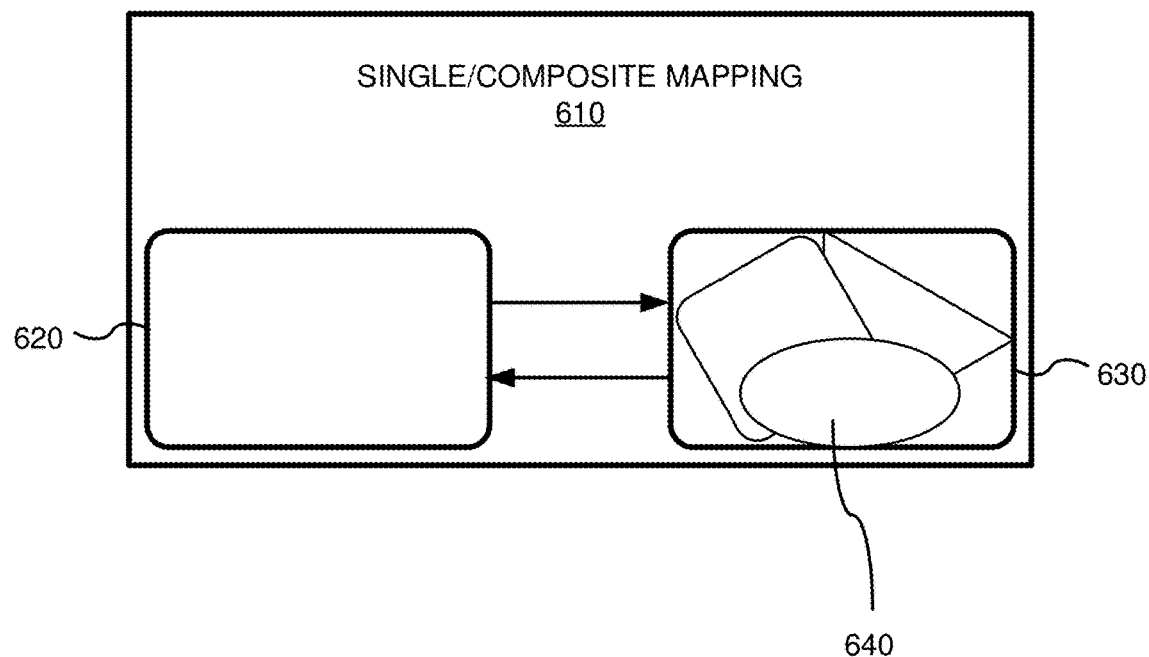
FIG. 6 is block diagram of an example conversion between single and composite controls.

FIG. 6 is block diagram of an example conversion 600 between single and composite controls. Single/composite mapping 610 can be accomplished using custom extensions, such as shown in FIG. 4. Custom extensions can be used during mapping to convert a single control 620 to composite control 630. Composite control 630 is comprised of two or more single controls arranged as properties 640.

When conversion between single and composite controls is indicated, the mapping can call the custom extensions. However, single-to-composite conversion can be achieved with templates that do not have custom extensions through code. Custom extensions can be formatted in a non-declarative programming language, such as JavaScript, that can create the composite control and pass it to the mapping. Alternatively, the custom extension or code can break up a composite control and pass several single controls to the mapping. Mapping instructions can then move the received control to the appropriate level of the target user interface hierarchy. Mapping can then pass the control information back to the template.

In any of the examples herein, at least one of the templates can compose a plurality of properties in the input declarative representation into a single property in the output declarative representation. For example, the same rendered user interface feature can be implemented as more than one property in the input, but be implemented as a single property in the output.

Similarly, at least one of the templates can decompose a single property in the input declarative representation of the user interface into a plurality of properties in the output declarative representation.

Example 17

Example Conversion within and Between User Interface Technologies

In any of the examples herein, a user interface can represent a mockup, e.g., a model, or it can represent an interactive runtime user interface. Conversion can be within or between either of these user interface types.

Figure 7:
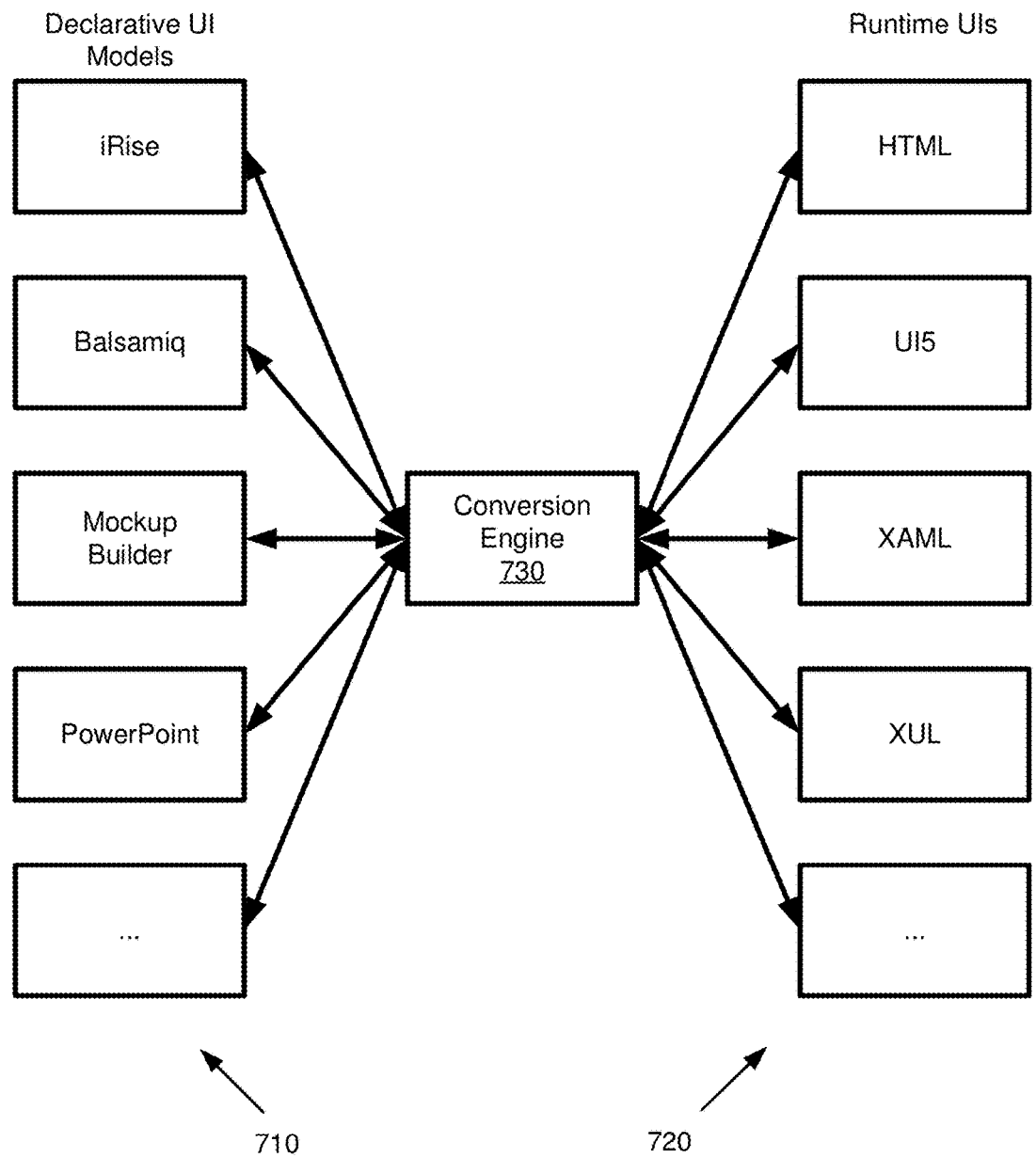
FIG. 7 is block diagram of example conversion between different user interface technologies.

FIG. 7 is block diagram of example conversion 700 between different user interface technologies. Declarative user interface models 710 can be converted to runtime user interfaces 720 using the conversion engine 730. As shown in the example, conversion can also be within declarative user interface models 710 or runtime user interfaces 720. For example, a mockup user interface created in iRise can be converted to another user interface technology, such as Microsoft PowerPoint technology. Conversion of a runtime user interface represented in HTML can be converted to SAP UI5. Any combination of converting between or within declarative user interface models 710 and/or runtime user interfaces 720 can be achieved.

Example 18

Example Conversion of Mockup User Interface to Runtime User Interface

Figure 8:
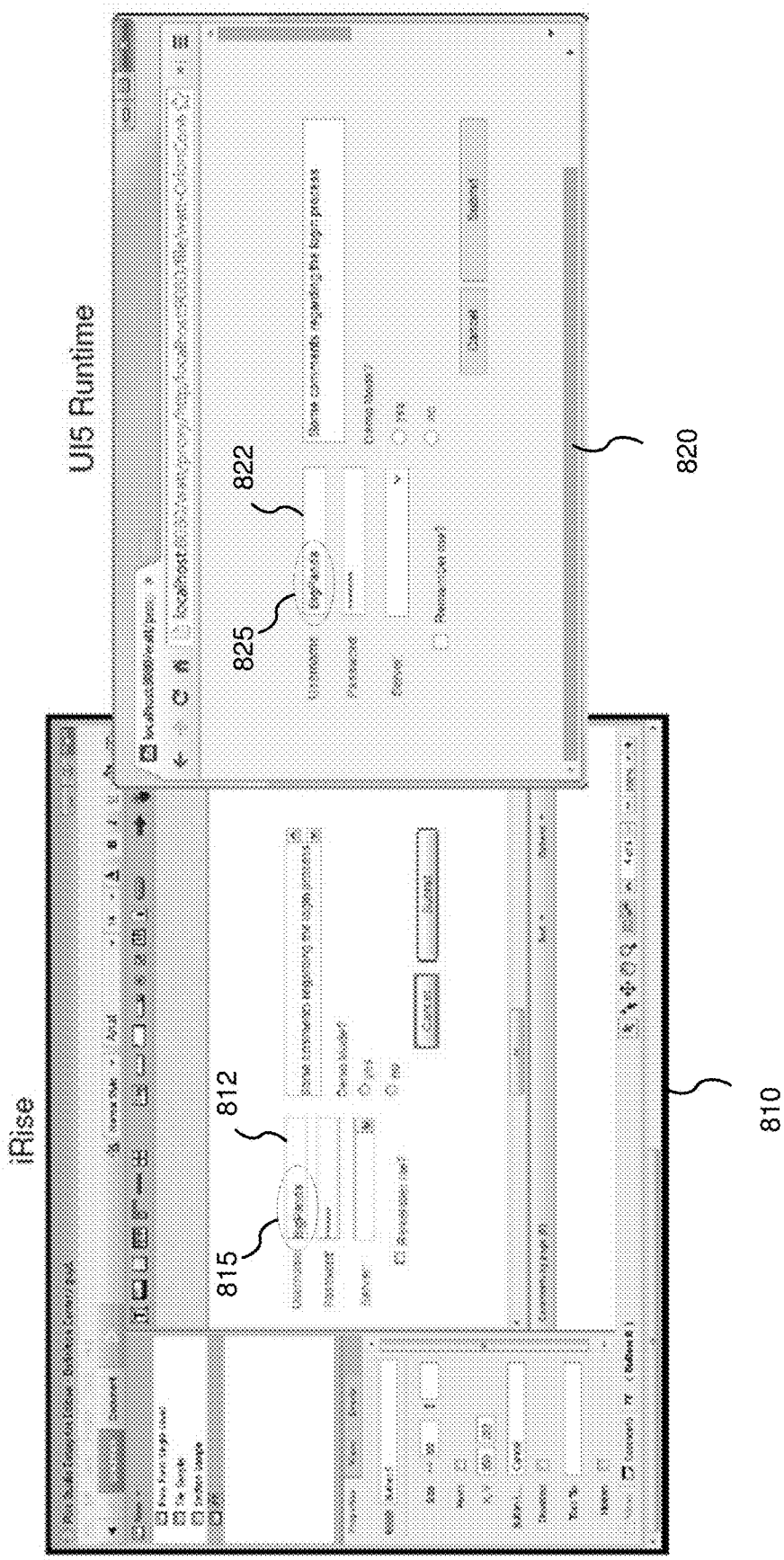
FIG. 8 is an example screenshot showing a user interface mockup converted to a runtime user interface.

FIG. 8 is an example screenshot 800 showing a user interface mockup converted to a runtime user interface. In the example, a mockup user interface 810 created in iRise is converted using the technologies described herein to a runtime user interface 820 represented as SAP UI5. User interface mockup 810 does not allow meaningful user interaction, whereas runtime user interface 820 does. The example shows conversion of controls, as shown, "username" control 812 is converted from iRise to a "username" control 822 in SAP UI5. The property associated with the control is also converted. As shown, username "BigPanda" 815 in iRise is converted to username "BigPanda" 825 in SAP UI5.

In practice, the declarative representations of the user interfaces on which the rendered versions are generated can be different, using different keywords, property names, or the like. However, the look and feel of the user interface is preserved across the conversion process as shown.

Example 19

Example Template Helpers

Figure 10:
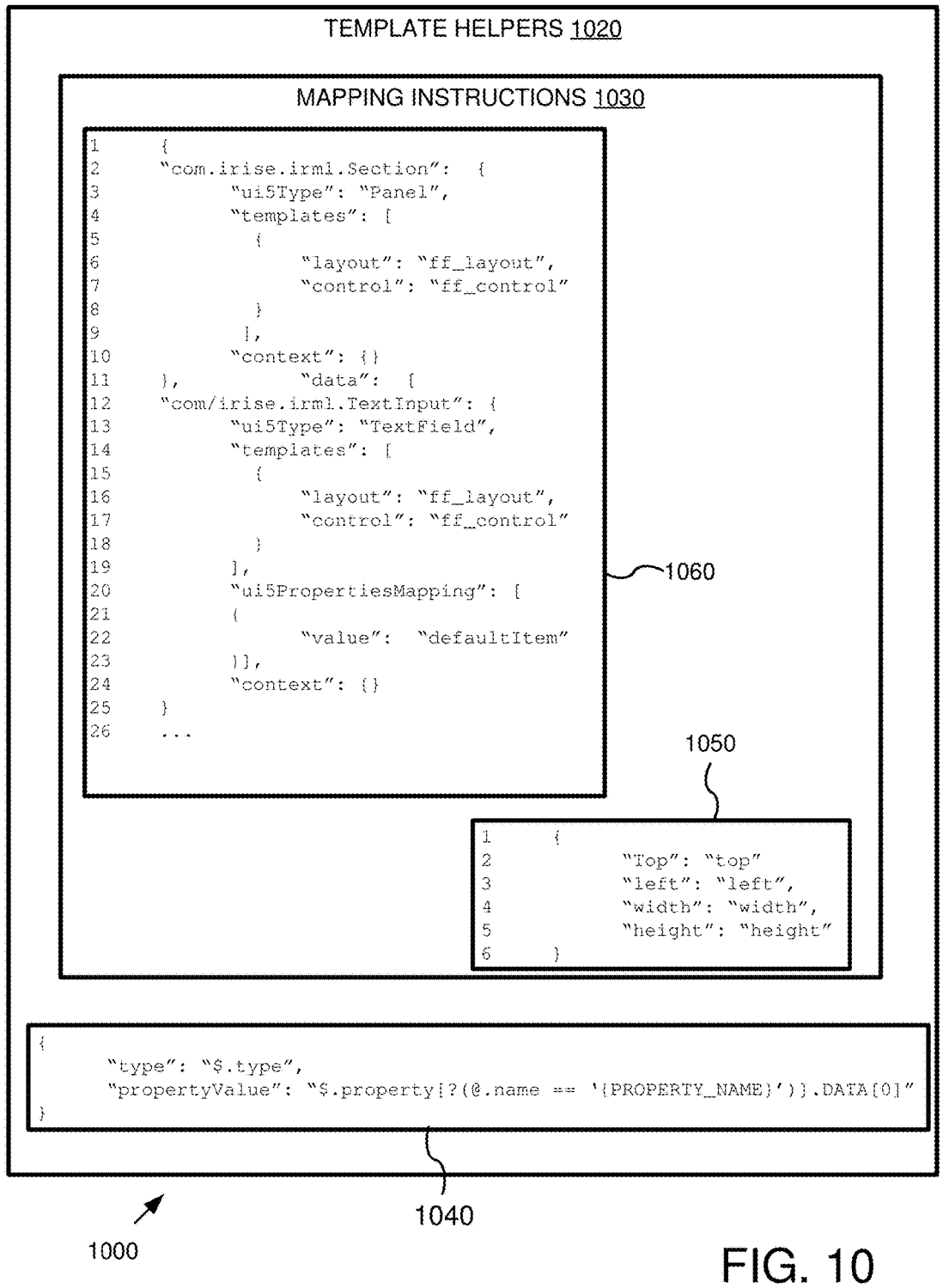

FIGS. 9 and 10 show example code snippets 900, 1000 of input user interface code and template helpers used to create output user interface code.

Input user interface 910 is represented in declarative code. In the example, the code represents a control ("com.irise.irml.TextInput") designed in iRise and is in JSON notation. The code can instead be represented in XML or another hierarchical, declarative language. The control contains several properties under the "property" field.

Template helpers 1020 comprise mapping instructions 1030 and parsing instructions 1040. Mapping instructions 1030 can include common property instructions 1050, which are required across multiple programming elements. Mapping instructions can also include specific instructions 1060, which are specific to certain program elements.

Template helpers 1020 can also include custom extensions (not shown), which can execute further programmatic control over mapping. For example, composite controls comprising a control element and property elements can be broken up into single controls, thereby transforming at least some properties into controls. Custom extensions can be used for special handling, calculations, or the like.

Example 20

Example Template Code Execution

FIG. 11 shows the hierarchical execution of templates. In the example, the templates are used by a conversion engine to create code for a declarative user interface in SAP UI5. The created code is of a hierarchical, declarative format.

As shown, full view template 1110 combines the view and layout levels of a user interface hierarchy. Therefore, as described herein, full view template 1110 is both a full template and recursive. In other words, the template is used to create a renderable user interface and can call lower level templates one or more times. The conversion engine executes full view template 1110 in sequence until it reaches call 1115, where control template 1120 is executed. Call 1115 can be part of a loop structure in a template, such that it is executed more than once. In the example, the call is part of an "each" loop, where a call is made until no more controls are found in the input user interface.

Control template 1120 is a partial template, thus creating only a control within the full view. Control template 1120 calls mapping instructions 1130 and parsing instructions 1140 to extract control type, and certain property values from input user interface related to the control. Control template 1120 converts the control type of the respective control from the input user interface and creates output of a declarative format within the respective full view for the output user interface. Control template 1120 then calls property template 1150 at call 1145. Property template 1150 can be called once for each control.

The property template 1150 is a partial template, thus creating only properties within the control. Property template 1150 calls mapping instructions 1160. Property template 1150 converts each property of the respective control from the input user interface and creates declarative user interface representation within the respective control for the output user interface.

Upon completing execution of property template 1150, execution returns to control template 1120. Upon completing execution of control template 1120, execution returns to full view template 1110. Upon return of execution to full view template 1110, call 1115 is repeated until no more controls are found in the input user interface.

Example 21

Example Mapping Instructions

In any of the examples herein, mapping instructions can be used to convert declarative programming elements from one language to another. Mapping instructions are specific to the input and output languages, but take advantage of the hierarchical structure of the declarative user interface representations, as described herein.

Mapping instructions can be called from any template in the template hierarchy to convert properties. A single mapping table can be used by plural templates.

A mapping table can be stored in memory. When the input is parsed (e.g., using parsing instructions to find the respective view/layout/properties/control), it examines the controls found as input. Using the mapping table, it can get the result controls and property mapping. The functionality can be wrapped as a template helper that is used by the templates (e.g., ui5PropertyMappingValue).

Example 22

Example Parsing Instructions

In any of the examples herein, parsing instructions can be used to locate the context of programming elements in a user interface represented by a declarative representation of a user interface. Parsing instructions provide mapping instructions with a context in order to complete mapping.

Parsing instructions can take the form of JSONPATH, XPATH, or similar notation.

Parsing instructions can be used by the conversion engine to discover the hierarchical structure of the input user interface. The engine thus uses the instructions to understand which templates to execute with which input scope (e.g., control, property, value, or the like).

Example 23

Example Implementation

Although any number of conversion engines can be implemented, one example takes the form of the handlebars.js template engine for processing templates.

Example 24

Example Advantages

The technologies described herein can provide automatic conversion of user interfaces from one hierarchical, declarative format to another, without the need to create new templates. For a particular output user interface, the templates can remain the same regardless of the format of the input user interface representation.

Also, using custom extensions, controls and properties can be moved from one hierarchical level to another. This allows mapping of composite elements in one language to multiple single controls in another language, or vice versa.

Example 25

Example Computing Systems

Figure 12:
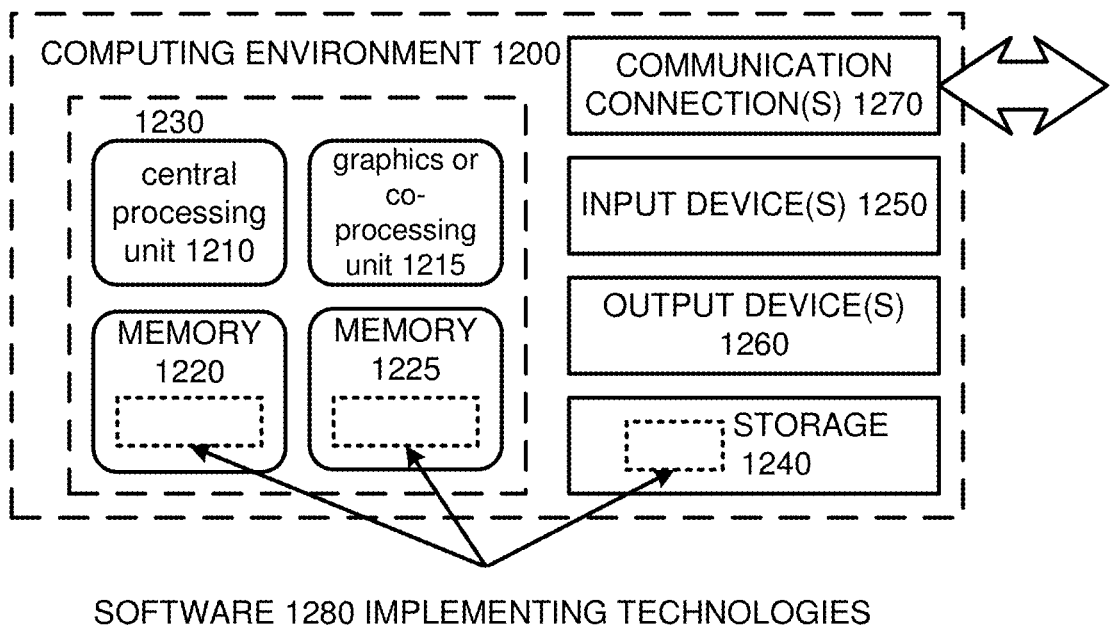
FIG. 12 is a diagram of an example computing system in which described embodiments can be implemented.

FIG. 12 illustrates a generalized example of a suitable computing system 1200 in which several of the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 26

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method of automated conversion of an input declarative representation of a user interface into an output declarative representation of the user interface of a different format, the method comprising:
    receiving the input declarative representation of the user interface, wherein the input declarative representation of the user interface is of a first declarative format having a first plurality of hierarchical levels;
    receiving a selection of a second declarative format having a second plurality of hierarchical levels;
    identifying a hierarchical arrangement of templates designated for converting a user interface representation to the second declarative format, wherein the templates are dedicated to processing respective hierarchical levels in the output declarative representation of the user interface in the second declarative format, wherein the hierarchical arrangement of templates comprises different hierarchical levels mirroring hierarchical levels common to declarative user interface representations; and
    converting the input declarative representation of the user interface in the first declarative format into the output declarative representation of the user interface in the second declarative format, wherein the converting comprises executing the hierarchical arrangement of templates, wherein the executing comprises:
        dividing mapping work among the hierarchical arrangement of templates according to the respective hierarchical levels in the output declarative representation to which the templates are respectively dedicated, wherein dividing mapping work comprises a higher-level template calling a lower-level template with mapping work applicable to the lower-level template; and mapping user interface elements in the input declarative representation of the user interface in the first declarative format to user interface elements in the output declarative representation of the user interface in the second declarative format according to the templates.

2. The method of claim 1 wherein the executing comprises:

traversing successive levels of the hierarchical levels in the output declarative representation of the user interface, wherein the traversing comprises following references in higher level templates to lower level templates in the hierarchical arrangement of templates.

3. The method of claim 1 wherein:

the hierarchical arrangement of templates comprises a plurality of different levels mirroring hierarchical levels common to declarative user interface representations; and the templates process user interface elements of the declarative user interface representation corresponding to their respective hierarchical levels.

4. The method of claim 1, wherein at least one of the templates composes a plurality of properties in the input declarative representation of the user interface into a single property in the output declarative representation of the user interface.

5. The method of claim 1, wherein at least one of the templates decomposes a single property in the input declarative representation of the user interface into a plurality of properties in the output declarative representation of the user interface.

6. The method of claim 1, wherein at least one of the templates invokes itself via recursion, the recursion processing a plurality of declarative user interface elements inside a single logical level within the output declarative representation.

7. The method of claim 1, wherein at least one of the templates invokes a template helper comprising executable code performing a calculation mapping a user interface element of the first hierarchical, declarative format to a user interface element of the second hierarchical, declarative format.

8. The method of claim 7, wherein the calculation maps a series of numbers to a string.

9. The method of claim 7, wherein the calculation maps a number to a binary.

10. The method of claim 1, wherein at least one of the templates invokes a template helper comprising a mapping table.

11. The method of claim 1, wherein the hierarchical arrangement of templates comprises a view template, a layout template, a control template, and a properties template;

wherein the view template, the layout template, the control template, and the properties template are at different levels of the hierarchical arrangement.

12. The method of claim 11, wherein executing the hierarchical arrangement of templates comprises:

executing the view template;
calling the layout template from within the view template;
calling the control template from within the layout template; and
calling the properties template from within the control template.

13. The method of claim 11, wherein the view template and the layout template are merged into a single template.

14. The method of claim 1, wherein:

the input declarative representation of the user interface is of a format for mock user interfaces; and
the output declarative representation of the user interface is of a format for functioning user interfaces.

15. One or more non-transitory computer-readable media comprising computer-executable instructions that when executed cause a computing system to perform the a method comprising:

receiving the input declarative representation of the user interface, wherein the input declarative representation of the user interface is of a first declarative format having a first plurality of hierarchical levels;

receiving a selection of a second declarative format having a second plurality of hierarchical levels;

identifying a hierarchical arrangement of templates designated for converting a user interface representation to the second declarative format, wherein the templates are dedicated to processing respective hierarchical levels in the output declarative representation of the user interface in the second declarative format, wherein the hierarchical arrangement of templates comprises different hierarchical levels mirroring hierarchical levels common to declarative user interface representations; and converting the input declarative representation of the user interface in the first declarative format into the output declarative representation of the user interface in the second declarative format, wherein the converting comprises executing the hierarchical arrangement of templates, wherein the executing comprises:

dividing mapping work among the hierarchical arrangement of templates according to the respective hierarchical levels in the output declarative representation to which the templates are respectively dedicated, wherein dividing mapping work comprises a higher-level template calling a lower-level template with mapping work applicable to the lower-level template; and mapping user interface elements in the input declarative representation of the user interface in the first declarative format to user interface elements in the output declarative representation of the user interface in the second declarative format according to the templates.

16. A system configured to convert a representation of a user interface from an input declarative user interface representation format into an output declarative user interface representation format, the system comprising:

a plurality of templates arranged in a hierarchy, wherein at least two of the templates are partial templates dividing mapping work according to a hierarchical level to which a template is dedicated, wherein at least one of the plurality of templates supports composite controls conversion, wherein the plurality of templates arranged in a hierarchy comprises a plurality of different hierarchical levels mirroring hierarchical levels common to declarative user interface representations;

a plurality of property mappings referenced by the templates;

a plurality of parsing instructions configured to parse declarative user interface representations of the input declarative user interface representation format; and a conversion engine configured to execute the parsing instructions, execute the plurality of templates in hierarchical order based on the executed parsing instructions and the plurality of property mappings, and output a declarative representation of the user interface in the output declarative user interface representation format, wherein the conversion engine executes the parsing instructions via one or more processors coupled to one or more memories.

17. The system of claim 16, wherein at least one of the templates implements recursion, the recursion processing a plurality of user interface elements contained in a higher-level user interface element.

18. The system of claim 16, further comprising:
template helpers comprising custom extensions and mapping semantics;
parsing instructions;
wherein, responsive to code in the templates, the conversion engine is configured to map parameters from the input declarative user interface representation format to the output declarative user interface representation format using the template helpers, and configured to parse the input declarative user interface representation format using the parsing instructions.

19. The system of claim 18, wherein:
the plurality of templates comprise a view template, a layout template, a control template, and properties template;
the layout template is called from within the view template;
the control template is called from within the layout template; and
the properties template is called from within the control template.

20. One or more non-transitory computer-readable media comprising computer-executable instructions that when executed cause a computing system to perform a method comprising:
receiving a declarative input representation of a user interface in a first hierarchical, declarative format; and
executing a plurality of templates arranged in a hierarchy to generate an output declarative representation of the user interface, wherein the plurality of templates comprises a full view template dedicated to generating a full view of the output declarative representation of the user interface, a layout template dedicated to generating a layout of the output declarative representation of the user interface, a control template dedicated to generating controls of the output declarative representation of the user interface, and a property template dedicated to generating properties of the output declarative representation of the user interface, wherein the property template converts individual properties in the input representation of the user interface to properties in the output declarative representation of the user interface;
wherein the hierarchy of templates comprises a plurality of different levels mirroring hierarchical levels common to declarative user interface representations; and
the plurality of templates process user interface elements of the declarative input representation corresponding to their respective hierarchical levels.

* * * * *